United States Patent
Miyoshi

(10) Patent No.: US 7,707,876 B2
(45) Date of Patent: May 4, 2010

(54) METHOD FOR ESTIMATING TIRE FORCE ACTING ON ROLLING TIRE

(75) Inventor: Akihiro Miyoshi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 206 days.

(21) Appl. No.: 12/076,931

(22) Filed: Mar. 25, 2008

(65) Prior Publication Data
US 2008/0245459 A1 Oct. 9, 2008

(30) Foreign Application Priority Data

Apr. 6, 2007 (JP) .............................. 2007-100833
Apr. 6, 2007 (JP) .............................. 2007-100835

(51) Int. Cl.
*G01M 17/02* (2006.01)

(52) U.S. Cl. ....................................................... 73/146

(58) Field of Classification Search ........................ None
See application file for complete search history.

(56) References Cited

U.S. PATENT DOCUMENTS 6,523,408 B1 * 2/2003 Colarelli et al. ................ 73/460
6,756,892 B2 * 6/2004 Konchin et al. ............. 340/447
7,249,498 B2    7/2007 Miyoshi et al.
7,315,777 B2 * 1/2008 Ono ............................. 701/70
7,506,539 B2 * 3/2009 Miyoshi et al. ............... 73/146

* cited by examiner

*Primary Examiner*—Andre J Allen
(74) *Attorney, Agent, or Firm*—Birch, Stewart, Kolasch & Birch, LLP

(57) ABSTRACT

A method for estimating the magnitude of a tire force acting on a rolling tire is disclosed, wherein: using at least seven sensors mounted on a tire sidewall portion, surface strain is simultaneously measured at seven measuring positions; with respect to a combination of the seven measuring positions, a coefficient matrix representing correlation with seven force components is defined, and a equation including the coefficient matrix is defined; using the data on the surface strain measured with the sensors, the equation is computed to find at least one of the seven force components, e.g. air pressure. The estimated air pressure is compared with a reference pressure, to determine whether the tire pressure is dropped or not. Further, a secondary sensor is mounted in a peculiar region where the surface strain is substantially not affected by the vertical load.

12 Claims, 8 Drawing Sheets

| Combination | Measuring positions J1, J2, J3, J4, J5, J6 and J7 are: | | | | | | |
|---|---|---|---|---|---|---|---|
| 1 | P1 | P2 | P3 | P4 | P5 | P6 | P7 |
| 2 | P1 | P2 | P3 | P4 | P5 | P6 | P8 |
| 3 | P1 | P2 | P3 | P4 | P5 | P7 | P8 |
| 4 | P1 | P2 | P3 | P4 | P6 | P7 | P8 |
| 5 | P1 | P2 | P3 | P5 | P6 | P7 | P8 |
| 6 | P1 | P2 | P4 | P5 | P6 | P7 | P8 |
| 7 | P1 | P3 | P4 | P5 | P6 | P7 | P8 |
| 8 | P2 | P3 | P4 | P5 | P6 | P7 | P8 |

METHOD FOR ESTIMATING TIRE FORCE ACTING ON ROLLING TIRE

BACKGROUND OF THE INVENTION

The present invention relates to a method for estimating the magnitude of a force acting on a rolling tire based on the strain caused in the tire sidewall portion.

In recent years, computer-aided vehicle control systems (CAVCS), e.g. anti-lock brake system (ABS), traction control system, vehicle stability control system, attitude control system, suspension control system and steer-by-wire system and the like, are widely used in various vehicles.

In order to improve the control accuracy of such control system (CAVCS) by providing the system with data on the force components acting on a rolling tire, a method for estimating the magnitude of the force components have been proposed in the U.S. Pat. No. 7,249,498.

On the other hand, from the viewpoint of safe driving, it is important to monitor the tire air pressure and also important to be able to provide the estimated data even if some of sensors or data get out of order.

SUMMARY OF THE INVENTION

A primary object of the present invention is therefore, to provide a method for estimating the magnitude of a force component acting on a rolling tire such as tire air pressure, longitudinal force and the like based on the strain caused in the tire sidewall portion.

Another object of the present invention is to detect a tire pressure drop, based on a comparison between the estimated air pressure and a predetermined reference pressure.

Still another object of the present invention is to estimate the magnitude of the longitudinal force by the use of strain sensor(s) as less as possible.

According to the present invention, a method for estimating the magnitude of a tire force acting on a rolling tire comprises:

using seven sensors mounted on the tire at circumferentially different mounting positions;

measuring a strain at seven different measuring positions (i) at a certain point of time during tire rolling by the use of said seven sensors, wherein each of the measuring positions (i) is such a position that the magnitude $t(i)$ of the strain to be measured has a substantially linear correlation with each of seven force components which are a longitudinal force $Fx$, a side force $Fy$, a vertical load $Fz$, an overturning moment $Mx$, a rolling resistance moment $My$, a self-aligning torque $Mz$ and an air pressure $P$ acting on the tire, whereby the following conditional equation is satisfied:

$$t(i)=a(i) \cdot Fx+b(i) \cdot Fy+c(i) \cdot Fz+d(i) \cdot Mx+e(i) \cdot My+g(i) \cdot Mz+h(i) \cdot P$$

wherein $a(i)$, $b(i)$, $c(i)$, $d(i)$, $e(i)$, $g(i)$ and $h(i)$ are coefficients specific to the measuring position (i);

obtaining the magnitude $t(i)$ of the measured strain with respect to each of the seven different measuring positions (i), wherein (i) is from 1 to 7, whereby $$t1=a1 \cdot Fx+b1 \cdot Fy+c1 \cdot Fz+d1 \cdot Mx+e1 \cdot My+g1 \cdot Mz+h1 \cdot P$$

$$t2=a2 \cdot Fx+b2 \cdot Fy+c2 \cdot Fz+d2 \cdot Mx+e2 \cdot My+g2 \cdot Mz+h2 \cdot P$$

$$t3=a3 \cdot Fx+b3 \cdot Fy+c3 \cdot Fz+d3 \cdot Mx+e3 \cdot My+g3 \cdot Mz+h3 \cdot P$$

$$t4=a4 \cdot Fx+b4 \cdot Fy+c4 \cdot Fz+d4 \cdot Mx+e4 \cdot My+g4 \cdot Mz+h4 \cdot P$$

$$t5=a5 \cdot Fx+b5 \cdot Fy+c5 \cdot Fz+d5 \cdot Mx+e5 \cdot My+g5 \cdot Mz+h5 \cdot P$$

$$t6=a6 \cdot Fx+b6 \cdot Fy+c6 \cdot Fz+d6 \cdot Mx+e6 \cdot My+g6 \cdot Mz+h6 \cdot P$$

$$t7=a7 \cdot Fx+b7 \cdot Fy+c7 \cdot Fz+d7 \cdot Mx+e7 \cdot My+g7 \cdot Mz+h7 \cdot P;$$

defining the following 7×7 matrix of said coefficients $$\begin{vmatrix} a1 & b1 & c1 & d1 & e1 & g1 & h1 \\ a2 & b2 & c2 & d2 & e2 & g2 & h2 \\ a3 & b3 & c3 & d3 & e3 & g3 & h3 \\ a4 & b4 & c4 & d4 & e4 & g4 & h4 \\ a5 & b5 & c5 & d5 & e5 & g5 & h5 \\ a6 & b6 & c6 & d6 & e6 & g6 & h6 \\ a7 & b7 & c7 & d7 & e7 & g7 & h7 \end{vmatrix}$$

about a combination of said seven different measuring positions (i); and computing the following equation including said matrix $$\begin{vmatrix} Fx \\ Fy \\ Fz \\ Mx \\ My \\ Mz \\ P \end{vmatrix} = \begin{vmatrix} \text{Matrix} \\ \text{of} \\ \text{Coefficients} \end{vmatrix}^{-1} \begin{vmatrix} t1 \\ t2 \\ t3 \\ t4 \\ t5 \\ t6 \\ t7 \end{vmatrix}$$

to find at least one of the seven force components.

In order to achieve another object, the method further comprises:

comparing the estimated air pressure P with a reference air pressure; and determining whether the air pressure of the tire is dropped or not.

In order to achieve still another object, the method further comprises:

using a secondary sensor mounted on the tire at a secondary mounting position, wherein the secondary mounting position is such that, when the secondary mounting position comes to a secondary measuring position, the magnitude t' of a strain to be measured has a substantially linear correlation with the longitudinal force Fx, but the magnitude t' is substantially not affected by the vertical load Fz;

measuring the strain at said secondary measuring position by the use of said secondary sensor to obtain the magnitude t' thereof; and computing the following equation to find the longitudinal force Fx, $$Fx=t'/a'$$

wherein "a'" is a coefficient specific to the secondary measuring position.

Other objects and aspects of the invention will become apparent from the following description of embodiments with reference to the accompanying drawings.

DESCRIPTION OF THE PREFERRED EMBODIMENTS

Figure 1:
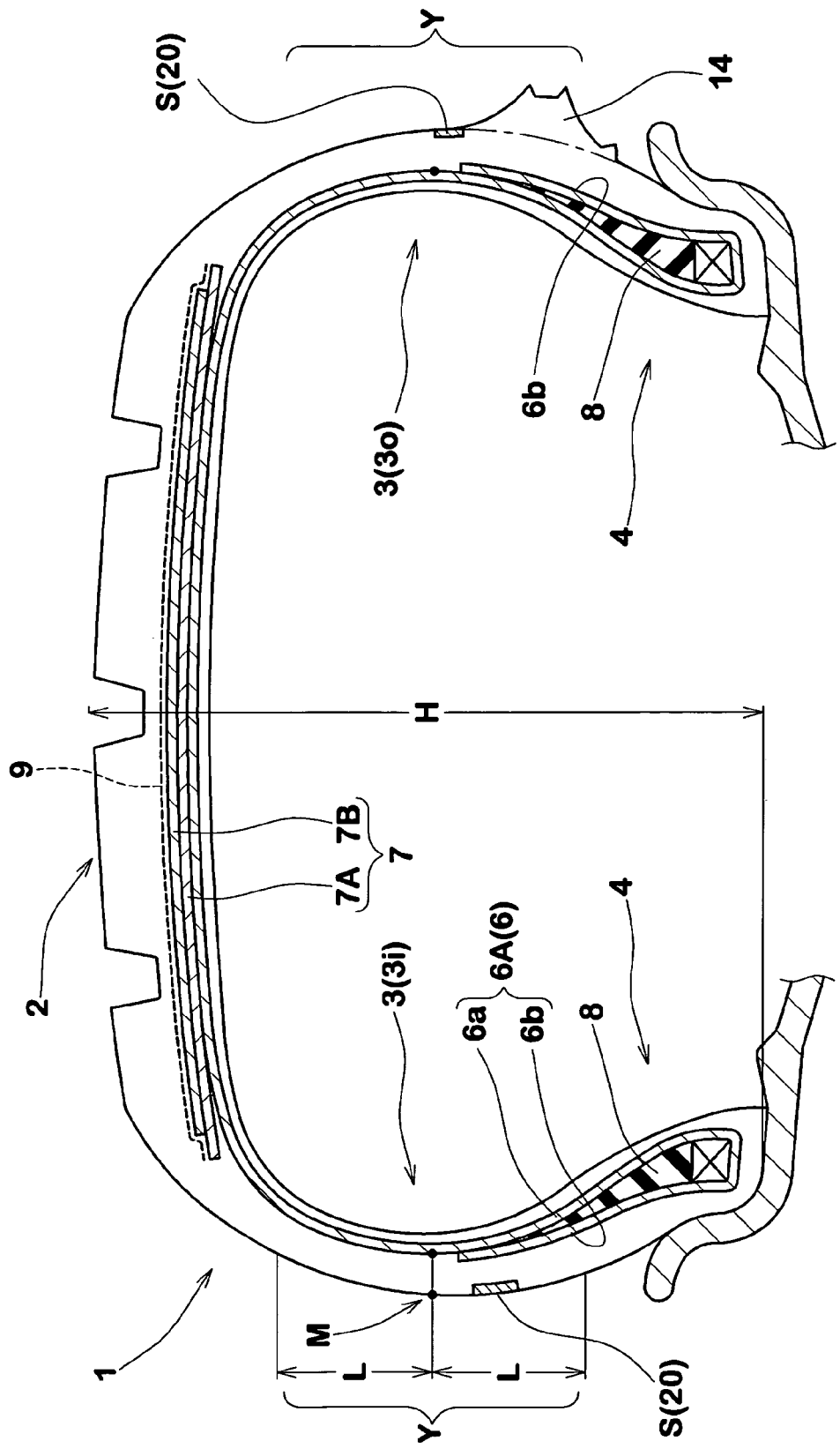
FIG. 1 is a cross-sectional view of a pneumatic tire provided with strain sensors for use with a device for estimating a tire force.
Figure 2:
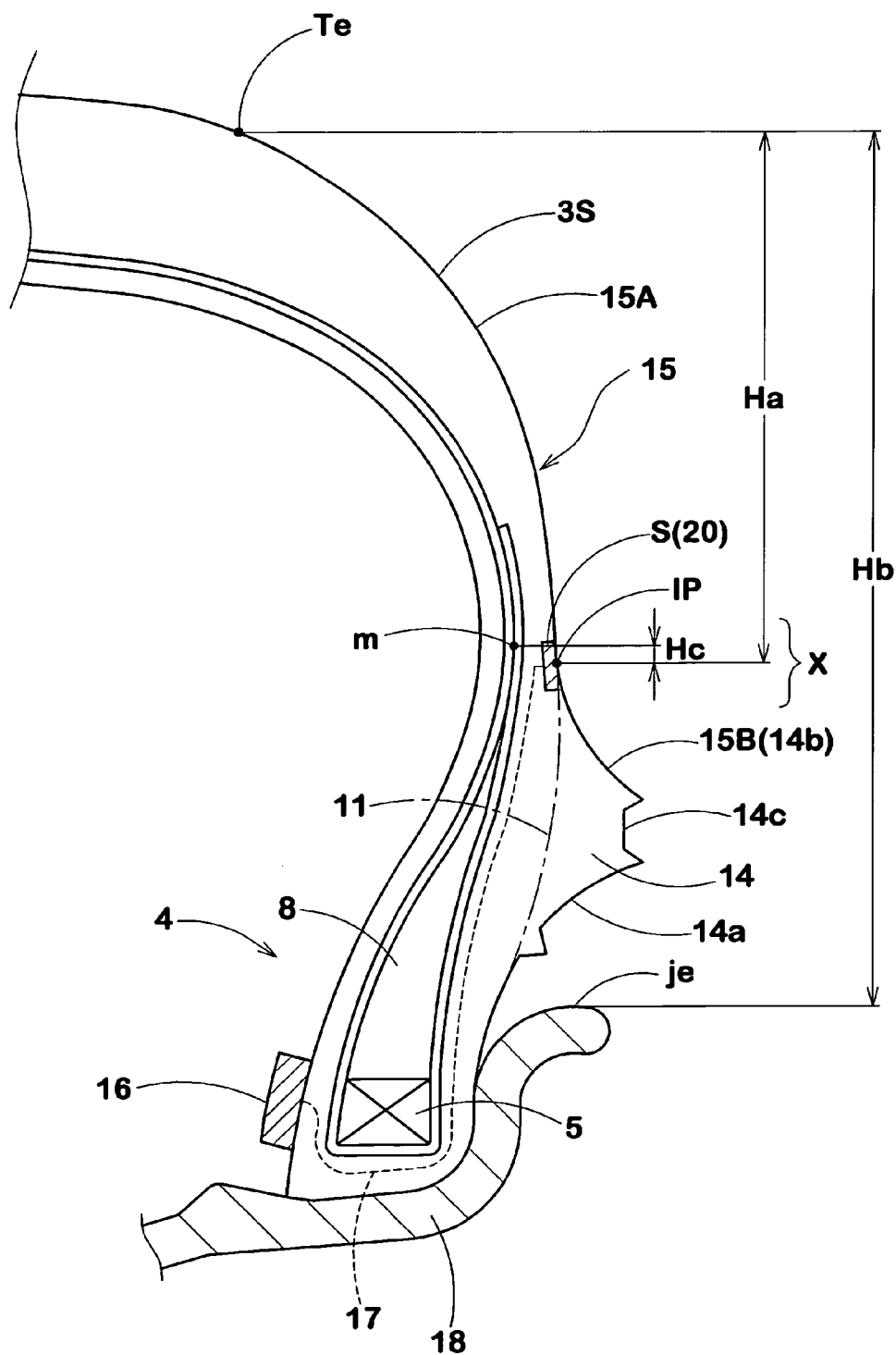
FIG. 2 is an enlarged schematic cross-sectional view of the sidewall portion having a peculiar outer profile.

Embodiments of present invention will now be described in detail in conjunction with accompanying drawings.

[Tire Structure]

In the drawings, pneumatic tire 1 according to the invention comprises: a tread portion 2; a pair of axially spaced bead portions 4 each with a bead core 5 therein; a pair of sidewall portions 3 (3i, 3o) extending between the tread edges Te and the bead portions 4; a carcass 6 extending between the bead portions 4; a tread reinforcing belt 7 disposed radially outside the carcass 6; and strain sensors S fixed to at least one of the sidewall portions 3. For example, the tire 1 is a radial tire of size 225/55R17 for passenger cars.

The carcass 6 is composed of at least one ply 6A of cords arranged radially at an angle in the range of from 70 to 90 degrees with respect to the tire equator, extending between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween. Between the main portion 6a and each turned up portion 6b, a bead apex 8 made of a hard rubber is disposed so as to extend radially outwardly from the bead core while tapering towards its radially outer end.

The belt comprises a breaker 7 and optionally a band 9. The breaker 7 comprises: at least two cross plies 7A and 7B of high modulus cords laid at an angle of from 10 to 35 degrees with respect to the tire equator. The band 9 is disposed on the radially outside of the breaker 7 and composed of a cord or cords wound at a small angle of at most about 5 degrees with respect to the tire equator.

[Tire Sidewall Profile]

In FIG. 1, one sidewall portion 3i has a typical outer profile, whereas the other sidewall portion 3o has a peculiar outer profile.

Here, the profile refers to that under the normally inflated unloaded condition of the tire. The normally inflated unloaded condition is such that the tire is mounted on a standard wheel rim and inflate to a standard pressure but loaded with no tire load. The standard wheel rim is a wheel rim officially approved for the tire by standard organization, i.e. JATMA (Japan and Asia), T&RA (North America), ETRTO (Europe), STRO (Scandinavia) and the like. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load capacity" in ETRTO, the maximum value given in the above-mentioned table in TRA or the like. In case of passenger car tires, however, the standard pressure is uniformly defined by 180 kPa.

In the case of the sidewall portion 3i, the outer profile 11 is substantially a continuously curved convex line, with the exception of possible various markings, decorative small grooves, ribs and the like. Usually, the outer profile is almost parallel with or similar to the profile of the carcass main portion 6a.

In the case of the sidewall portion 3o, on the other hand, an axially-outward protrusion 14 is formed in the lower sidewall portion. The protrusion 14 protrudes from the above-explained typical outer profile 11 largely when compared with the possible decorative small ribs and the like, and the peculiar outer profile is formed as described later.

In any case, at least one of the sidewall portions 3i and 3o is provided with a plurality of sensors S to sense strain of the outer surface (or surface layer).

[Strain Sensor]

As to the type of the sensor S, various types can be used as far as the sensor S can sense the surface strain $\epsilon$ and output an electronic data indicative of the magnitude (t) of the sensed strain $\epsilon$. The sensor should be heat-stable and mechanically stable and durable. Although piezoelectric element, wire resistance strain gauge and the like can be used as the sensor S, it is preferred to use a combination of a magnet 11 and an magnetometric sensor element 12. In such combination, at least one magnet 11 and at least one magnetometric sensor element 12 are embedded in a molded resilient body 13 as one unit 20. The resilient body 13 has to deform following the deformation of the tire sidewall portion 3, therefore, an elastomer material is used. In view of easiness of molding such as casting and injection molding, the use of a thermoplastic elastomer (TPE) is especially preferred. As to the magnetometric sensor element 12, various types of elements, for example, hall element, MR element, TMF-MI sensor, TMF-FG sensor, amorphous sensor and the like can be used. For example, a hall element is used.

Figure 3:
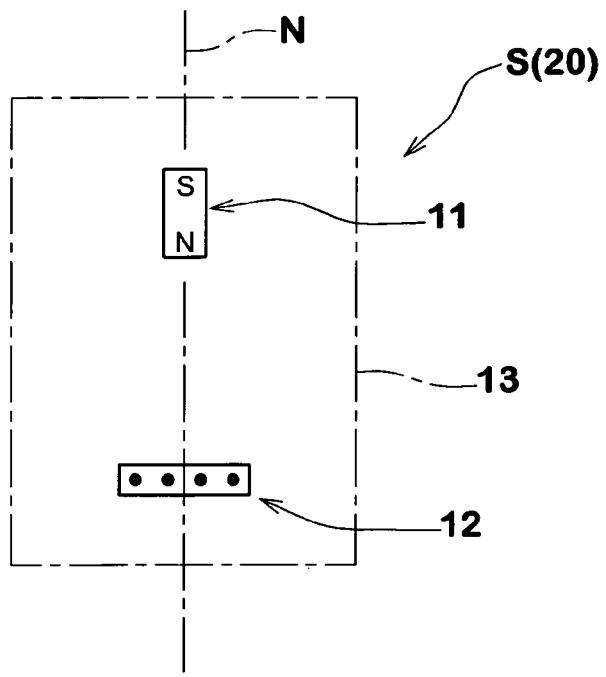
FIGS. 3, 4 and 5 are diagrams each showing a sensor unit.
Figure 4:
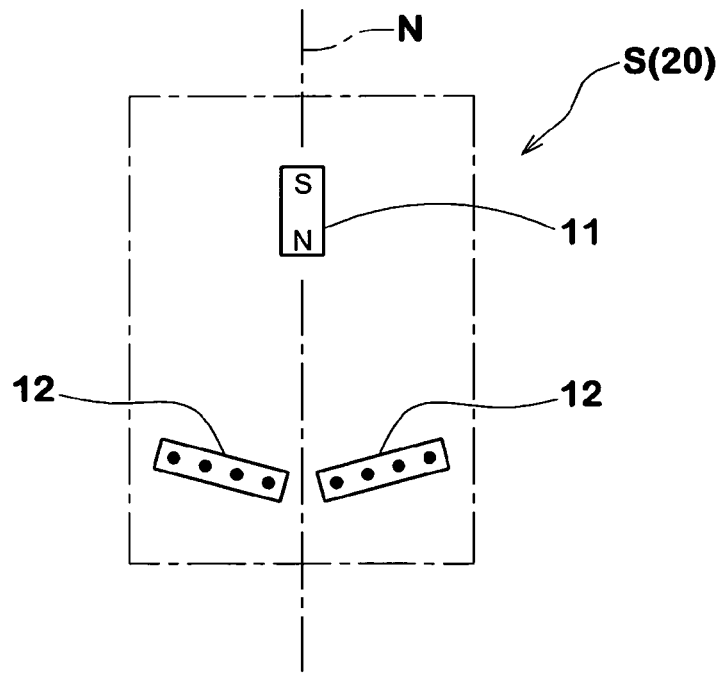
Figure 5:
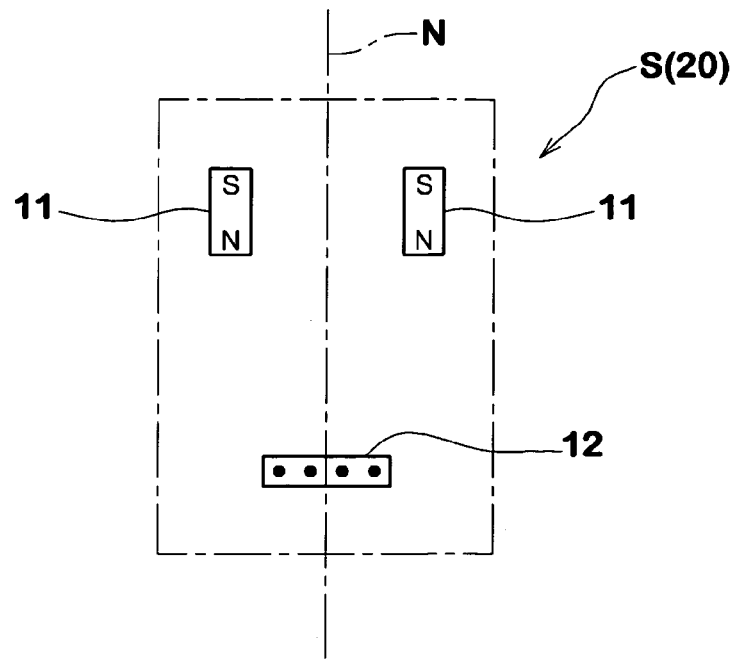

FIGS. 3 to 5 show examples of such magnet type sensor unit 20. In FIG. 3, the sensor unit 20 includes a single magnetometric sensor element 12 and a single magnet 11. In FIG. 4, the sensor unit 20 includes a plurality of magnetometric sensor elements 12 and a single magnet 11. In FIG. 5, the sensor unit 20 includes a single magnetometric sensor element 12 and a plurality of magnets 11. The sensor units 20 each have a directional sensibility, and the maximum sensibility occurs in a direction N.

Figure 6:
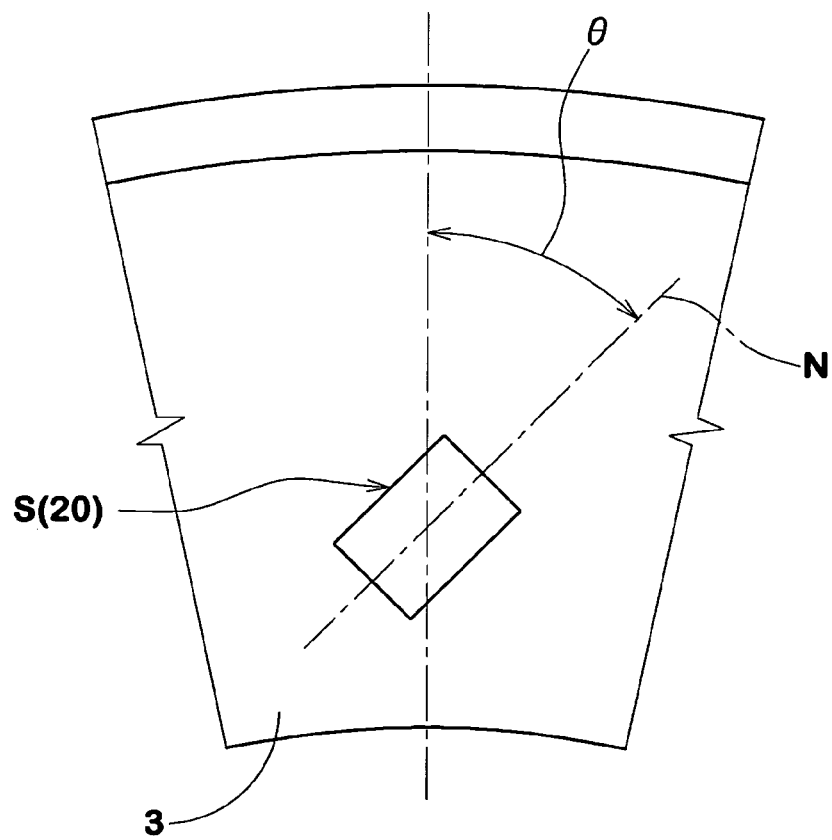
FIG. 6 is a schematic view for explaining the mounting angle of the sensor on the tire.

As shown in FIG. 6, in each of the sensor mounting positions, the sensor S or sensor unit 20 is oriented such that the angle theta between the maximum sensibility direction N and the tire radial direction becomes in a range of 10 to 80 degrees, preferably 20 to 70 degrees in view of the overall accuracy, more preferably 30 to 60 degrees, still more preferably 40 to 50 degrees when viewed from the side of the tire. For example, the angle theta is set at 45 degrees.

Therefore, the above-mentioned magnitude (t) of the sensed strain ε means that of the strain ε measured with the sensor S having a particular directional sensibility oriented towards a particular direction, thus, it is not always the same as the magnitude of the maximum strain perhaps occurring in a certain direction.

In order to simplify the subsequent data processing performed by a data processor, it is desirable to use the sensors S all of which have the same sensibility and are oriented toward the same direction at the same angle theta. Based on such assumption, the methods will be described hereinafter.

In order to transmit the sensor output data from the rolling tire to an electrical control unit mounted on the vehicle body side, a wireless connection is used.

Therefore, it is possible that the above-mentioned sensor unit 20 contains a transponder which can transmit the date indicative of the magnitude (t) towards the electrical control unit mounted on the vehicle body side, in response to a query signal sent via an electromagnetic wave from the electrical control unit.

Such transponder comprises a receiver, a transmitter, control circuit, data memory and the like which are formed on a semiconductor chip, and an antenna. Further, in order to utilize the above-mentioned electromagnetic wave as the source of electric energy, a converter and an electric accumulator/condenser are also incorporated in the unit 20.

Further, it is also possible that the transponder 16 is formed separately from the sensor unit 20 and attached to a stable portion of the tire such as the inside of the bead portion, or in the rim well of the wheel rim on which the tire is mounted. And the transponder 16 is connected to the sensor units 20 by electric wires 17 embedded in the tire when making the tire.

[Method for Estimating Magnitudes of Tire Force Components]

In the case of the sidewall portion 3i having the typical outer profile, in a mid-sidewall region Y as shown in FIG. 1, the magnitude of the strain ε has a substantially linear correlation with the magnitude of each of seven force components (longitudinal force Fx, side force Fy, vertical load Fz, overturning moment Mx, rolling resistance moment My, self-aligning torque Mz, and air pressure P).

Such region Y may extend radially inward and outward from the midpoint M by a radial distance L of 25% of the tire section height H at the maximum. To assure the linear correlation and sensitivity, it is preferable that the distance L is considered to be not more than 20%, more preferably not more than 15% of the tire section height H.

Here, the above-mentioned midpoint M is located at 50% of the tire section height H, and the tire section height H is measured from the bead base line BL to the tread surface at the tire equator C.

Therefore, in the region Y, the surface strain εx caused by a longitudinal force Fx can be approximated by a linear function f(Fx) of Fx:

$$\varepsilon x = f(Fx) = a \cdot Fx$$

the surface strain εy caused by a side force Fy can be approximated by a linear function f(Fy) of Fy:

$$\varepsilon y = f(Fy) = b \cdot Fy$$

the surface strain εz caused by a vertical load Fz can be approximated by a linear function f(Fz) of Fz:

$$\varepsilon z = f(Fz) = c \cdot Fz$$

the surface strain εmx caused by an overturning moment Mx can be approximated by a linear function f(Mx) of Mx:

$$\varepsilon mx = f(Mx) = d \cdot Mx$$

the surface strain εmy caused by a rolling resistance moment My can be approximated by a linear function f(My) of My:

$$\varepsilon my = f(My) = e \cdot My$$

the surface strain εmz caused by a self-aligning torque Mz can be approximated by a linear function f(Mz) of Mz:

$$\varepsilon mz = f(Mz) = g \cdot Mz$$

the surface strain εp caused by an air pressure P can be approximated by a linear function f(P) of P:

$$\varepsilon p = f(P) = h \cdot P$$

the overall surface strain ε is the summation of the aforementioned elemental surface strains εx, εy, εz, εmx, εmy, εmz, and εp:

$$\varepsilon = a \cdot Fx + b \cdot Fy + c \cdot Fz + d \cdot Mx + e \cdot My + g \cdot Mz + h \cdot P \quad \text{Eq. 1}$$

wherein, "a", "b", "c", "d", "e", "g" and "h" are coefficients which are specific to the position where the strain ε is caused, namely, the measuring position of the strain.

There exist seven variables P, Fx, Fy, Fz, Mx, My and Mz to be found. It is necessary to solve seven simultaneous equations of the seven variables.

Therefore, the overall surface strain ε have to be measured at seven different positions J1-J7 simultaneously at a certain point of time during tire rolling.

A detailed description of the measuring positions J1-J7 will be given afterward.

If suffix numbers "1"-"7" indicating the measuring positions J1-J7 are added to the aforementioned equation Eq. 1, then the following equations are formed at the respective measuring positions J1-J7:

$$\varepsilon 1 = a1 \cdot Fx + b1 \cdot Fy + c1 \cdot Fz + d1 \cdot Mx + e1 \cdot My + g1 \cdot Mz + h1 \cdot P$$

$$\varepsilon 2 = a2 \cdot Fx + b2 \cdot Fy + c2 \cdot Fz + d2 \cdot Mx + e2 \cdot My + g2 \cdot Mz + h2 \cdot P$$

$$\varepsilon 3 = a3 \cdot Fx + b3 \cdot Fy + c3 \cdot Fz + d3 \cdot Mx + e3 \cdot My + g3 \cdot Mz + h3 \cdot P$$

$$\varepsilon 4 = a4 \cdot Fx + b4 \cdot Fy + c4 \cdot Fz + d4 \cdot Mx + e4 \cdot My + g4 \cdot Mz + h4 \cdot P$$

$$\varepsilon 5 = a5 \cdot Fx + b5 \cdot Fy + c5 \cdot Fz + d5 \cdot Mx + e5 \cdot My + g5 \cdot Mz + h5 \cdot P$$

$$\varepsilon 6 = a6 \cdot Fx + b6 \cdot Fy + c6 \cdot Fz + d6 \cdot Mx + e6 \cdot My + g6 \cdot Mz + h6 \cdot P$$

$$\varepsilon 7 = a7 \cdot Fx + b7 \cdot Fy + c7 \cdot Fz + d7 \cdot Mx + e7 \cdot My + g7 \cdot Mz + h7 \cdot P$$

Herewith, a set of coefficients "a1, b1, c1, d1, e1, g1 and h1" are defined for the measuring position J1. Another set of coefficients "a2, b2, c2, d2, e2, g2 and h2" are defined for the ring position J2. Same applies to the other measuring positions J3 - - - .

From these equations, the following equation Eq. 2 is derived:

$$\begin{vmatrix} Fx \\ Fy \\ Fz \\ Mx \\ My \\ Mz \\ P \end{vmatrix} = \begin{vmatrix} a1 & b1 & c1 & d1 & e1 & g1 & h1 \\ a2 & b2 & c2 & d2 & e2 & g2 & h2 \\ a3 & b3 & c3 & d3 & e3 & g3 & h3 \\ a4 & b4 & c4 & d4 & e4 & g4 & h4 \\ a5 & b5 & c5 & d5 & e5 & g5 & h5 \\ a6 & b6 & c6 & d6 & e6 & g6 & h6 \\ a7 & b7 & c7 & d7 & e7 & g7 & h7 \end{vmatrix}^{-1} \begin{vmatrix} \epsilon 1 \\ \epsilon 2 \\ \epsilon 3 \\ \epsilon 4 \\ \epsilon 5 \\ \epsilon 6 \\ \epsilon 7 \end{vmatrix} \quad \text{Eq. 2}$$

Given that the magnitudes of the measured strain $\epsilon 1$-$\epsilon 7$ are t1-t7, respectively, the above-mentioned equation Eq. 2 is:

$$\begin{vmatrix} Fx \\ Fy \\ Fz \\ Mx \\ My \\ Mz \\ P \end{vmatrix} = \begin{vmatrix} a1 & b1 & c1 & d1 & e1 & g1 & h1 \\ a2 & b2 & c2 & d2 & e2 & g2 & h2 \\ a3 & b3 & c3 & d3 & e3 & g3 & h3 \\ a4 & b4 & c4 & d4 & e4 & g4 & h4 \\ a5 & b5 & c5 & d5 & e5 & g5 & h5 \\ a6 & b6 & c6 & d6 & e6 & g6 & h6 \\ a7 & b7 & c7 & d7 & e7 & g7 & h7 \end{vmatrix}^{-1} \begin{vmatrix} t1 \\ t2 \\ t3 \\ t4 \\ t5 \\ t6 \\ t7 \end{vmatrix} \quad \text{Eq. 2'}$$

Therefore, by computing this equation Eq. 2', the magnitudes of the force components P, Fx, Fy, Fz, Mx, My and Mz can be found.

Incidentally, the coefficients "a, b, c, d, e, g and h" for each of the measuring position J1-J7 (namely, P1-P8 in this example) are determined in advance through an experiment.

In the experiment, changing the magnitudes of the force components P, Fx, Fy, Fz, Mx, My and Mz applied to the tire, the overall surface strain $\epsilon$ is measured at each measuring position, and by making a numerical analysis on the measured values $\epsilon$ and the magnitudes of the applied force components P, Fx, Fy, Fz, Mx, My and Mz, with a computer, the coefficients are determined.

As mentioned above, the strain $\epsilon$ has to be measured at seven different positions J1-J7 simultaneously. Therefore, at least seven strain sensors S have to be mounted on the tire sidewall portion at circumferentially different positions.

Figure 7:
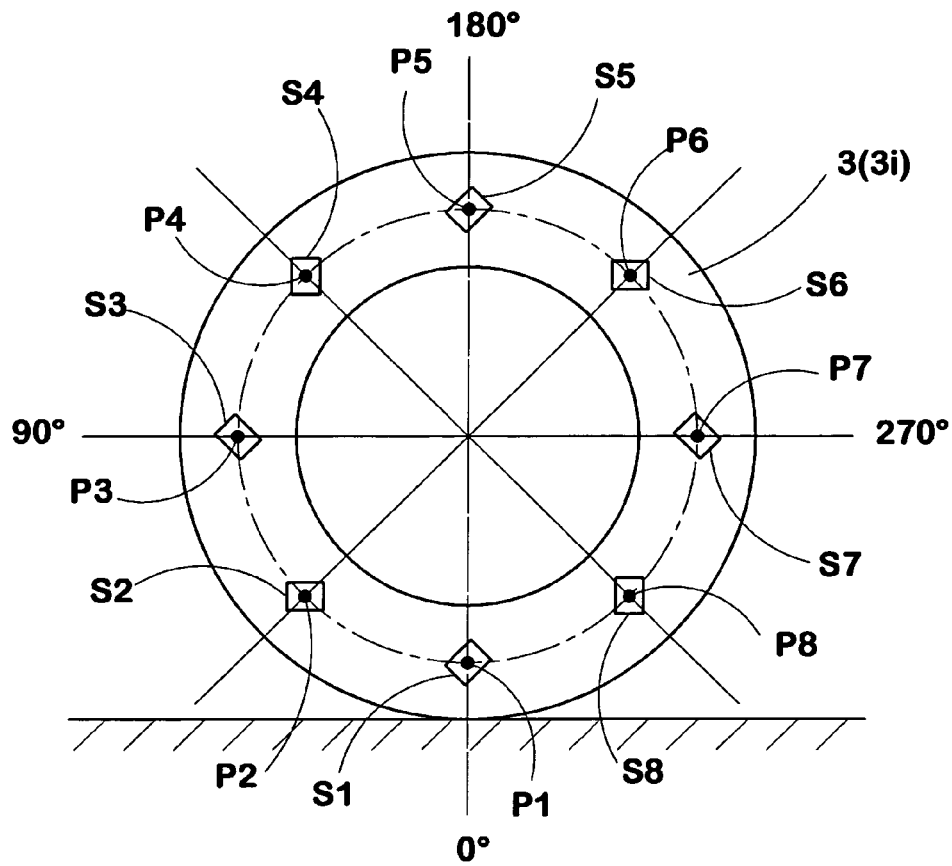
FIG. 7 is a schematic view showing the sidewall portion having a typical outer profile for explaining an arrangement of the sensors and an arrangement of the strain measuring positions.

In a sensor arrangement shown in FIG. 7, therefore, eight sensors S are used. All of the sensors S are arranged equiangularly around the tire rotational axis at the same radial height or position.

As to the interval of outputting the estimated data during running, it is desirable that the interval is as short as possible if permitted by the data processor although it is not always necessary if the air pressure P is the only force component to be obtained. In the case of the air pressure P only, the interval may be relatively long, for example once per one tire revolution.

In FIG. 7, the eight sensors S1-S8 are arranged at regular intervals of 45 degrees around the tire rotational axis. And eight positions P1-P8 for use as the measuring positions J1-J7 are prepared in advance at regular intervals of 45 degrees.

Figure 8:
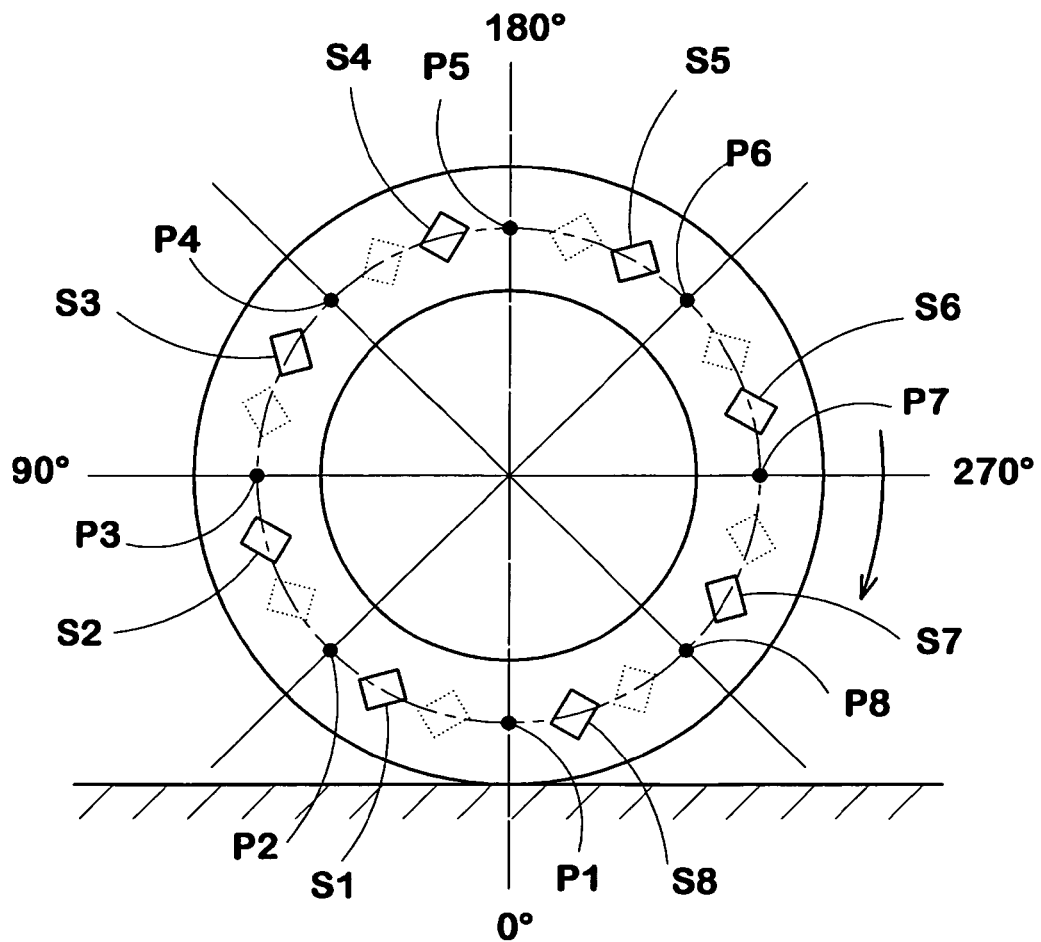
FIG. 8 is a schematic side view showing the tire moved clockwise by 30 degrees from the state shown in FIG. 7

As shown in FIGS. 7 and 8, the sensors S are moved around the tire rotational axis as the tire rotates since the sensors S are fixed to the tire sidewall portion 3, but, the positions P1-P8, namely, the measuring positions J1-J7 are fixed to a static polar coordinate system having the origin set at the tire rotational axis and being parallel with the tire equatorial plane. The polar angle of zero can be set at any direction, but in the illustrated example, for the sake of convenience, it is set at the vertically downward direction. Therefore, the polar angles of the polar coordinates of the positions P1-P8 are 0, 45, 90, 135, 180, 225, 270, and 315 degrees, respectively.

By such arrangement, the sensors S1-S8 come to the positions P1-P8 eight times per one tire revolution, namely, the measurement is possible at eight angular positions of the tire per one tire revolution. By detecting the angular position of the tire, it is possible to locate the sensors S to determine whether the sensors S come to the above-mentioned predetermined measuring positions. For this purpose, an angle sensor, e.g. an encoder and the like is attached to the axle, tire wheel, tire or the like.

In this example, it is possible to measure the overall surface strain $\epsilon$ at the eight positions P1-P8 simultaneously with the eight sensors S1-S8. But, in order to solve the above-mentioned equation Eq. 2, only seven data or sensors are necessary. Therefore, seven of eight sensors or data have to be selected. Accordingly, there are eight ways of selecting the sensors or data. To explain simply, the reference characters P1-P8 of the above-mentioned positions P1-P8 are used to indicate the sensors or data relating to the measuring positions J1-J7, the eight combinations are:

(P1, P2, P3, P4, P5, P6, P7);

(P1, P2, P3, P4, P5, P6, P8);

(P1, P2, P3, P4, P5, P7, P8);

(P1, P2, P3, P4, P6, P7, P8);

(P1, P2, P3, P5, P6, P7, P8);

(P1, P2, P4, P5, P6, P7, P8);

(P1, P3, P4, P5, P6, P7, P8); and (P2, P3, P4, P5, P6, P7, P8).

In other words, as being the seven measuring positions J1-J7, there are the above eight combinations.

In this example, with respect to all of the eight combinations of seven data, the equation Eq. 2' is computed to obtain eight intermediate results per one force component (e.g. tire pressure). Then, using the eight intermediate results, their average is computed as the final result of the force component. Therefore, even if some of sensors get out of order, it is possible to minimize the effect thereof on the estimated final result.

More specifically, with respect to each of the eight combinations, the following 7×7 matrix of the coefficients $$\begin{vmatrix} a1 & b1 & c1 & d1 & e1 & g1 & h1 \\ a2 & b2 & c2 & d2 & e2 & g2 & h2 \\ a3 & b3 & c3 & d3 & e3 & g3 & h3 \\ a4 & b4 & c4 & d4 & e4 & g4 & h4 \\ a5 & b5 & c5 & d5 & e5 & g5 & h5 \\ a6 & b6 & c6 & d6 & e6 & g6 & h6 \\ a7 & b7 & c7 & d7 & e7 & g7 & h7 \end{vmatrix}$$

is defined by the data processor, using the data on the coefficients stored in advance in a storage device.

Then, using the matrix, the above-mentioned equation Eq. 2 is formed by the data processor, and the equation Eq. 2' substituted by the magnitudes t1-t7 obtained and stored in the storage device, is computed to find the seven force components.

[Method for Detecting Tire Pressure Drop]

As mentioned above, an object of the present invention is to detect a tire pressure drop.

The air pressure P can be estimated as one of the seven force components as explained above. By the way, if the air pressure P is the only force component to be found, it is not necessary to compute and output the data on the other force components.

When the estimated air pressure P can be obtained, the pressure P is compared with a reference pressure Pp which is for example set in a range of 80 to 70% of the above-mentioned maximum pressure of the tire. If the obtained pressure P is less than the reference pressure Pp, then it is considered that the tire pressure is dropped, and thus, it is possible to activate an alarm system to warn the driver by warning sound and warning light. In this example, however, for the accuracy of warning, even if the pressure is once judged as being dropped in one comparison, only after the same result (pressure drop) comes out from at least one subsequent comparison, the pressure is judged as being actually dropped, and the warning is made.

[Secondary Method for Estimating Tire Force]

As having been described, at least seven sensors S are necessitated to obtain seven data even if only one of the force components is to be estimated.

On the other hand, for the brake control system such as ABS, it is important to receive the date indicative of the magnitude of the longitudinal force acting on the rolling tire even if some of the sensors get out of order.

Therefore, another object of the present invention is to estimate the magnitude of the longitudinal force acting on the rolling tire by the use of strain sensor(s) as less as possible in order that, even if some of the sensors get out of order, it is possible to output the estimated data for controlling the brake system.

Figure 10:
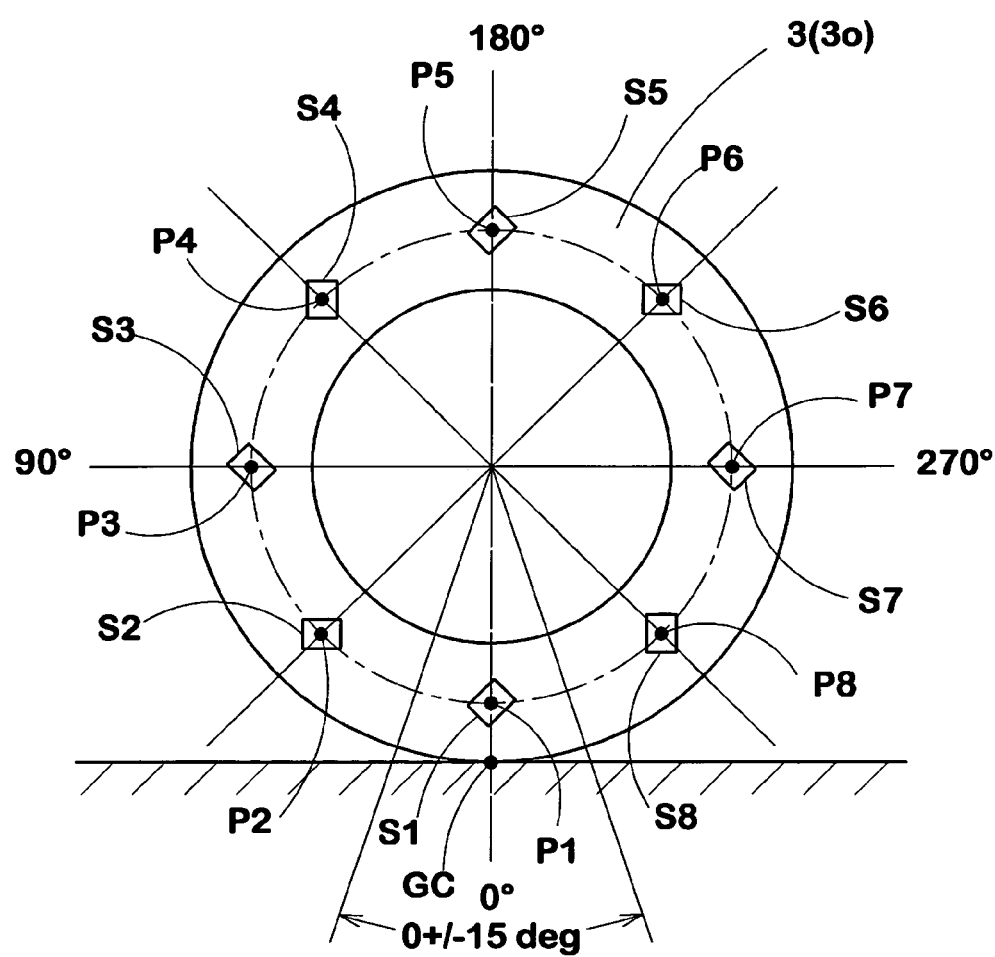
FIG. 10 is a schematic view showing the tire sidewall portion having the peculiar outer profile for explaining an arrangement of the sensors and an angular range where the stress neutral position occurs.

In the case of the above-mentioned sidewall portion $3o$ having the peculiar outer profile, if the measuring position J is angularly near the center GC of the ground contacting patch (for example, the polar angle of the coordinate of the measuring position is within the range of $0\pm30$ degrees, namely, 330 to 360=0 to 30 degrees, more noticeably $0\pm15$ degrees, namely, 345 to 360=0 to 15 degrees=FIG. 10), then, in a particular region X near the protrusion 14, although the surface strain $\epsilon$ has a substantially linear correlation with the longitudinal force Fx, a vertical load Fz does not affect the surface strain $\epsilon$.

The protrusion 14 extends continuously in the tire circumferential direction so as to provide a curved line 15 for the sidewall outer profile 3S. In the tire meridian section, the curved line 15 is made up of a radially outer convex part 15A and a radially inner concave part 15B which are connected with each other through an inflection point IP.

The convex part 15A extends along a convexly curved line similar to the aforementioned typical outer profile 11, and the concave part 15B extends from the radially inner end of the convex part 15A, defining a part of the outer profile of the protrusion 14.

The convex part 15A extends from the tread edge Te to the inflection point IP. The radial height or extent Ha of the convex part 15A is not less than 40%, preferably more than 50% of the sidewall height Hb.

The sidewall height Hb is the radial height between the tread edge Te and the radially outer end of the flange Fe of the standard rim. Thus, the convex part 15A forms a major part of the sidewall outer profile 3S.

The radial distance Hc between the inflection point IP and the maximum section width point m of the main portion 6a of the carcass 6, is not more than 30% of the sidewall height Hb. Preferably, the inflection point IP is positioned radially inward of the carcass maximum section width point m.

Figure 9:
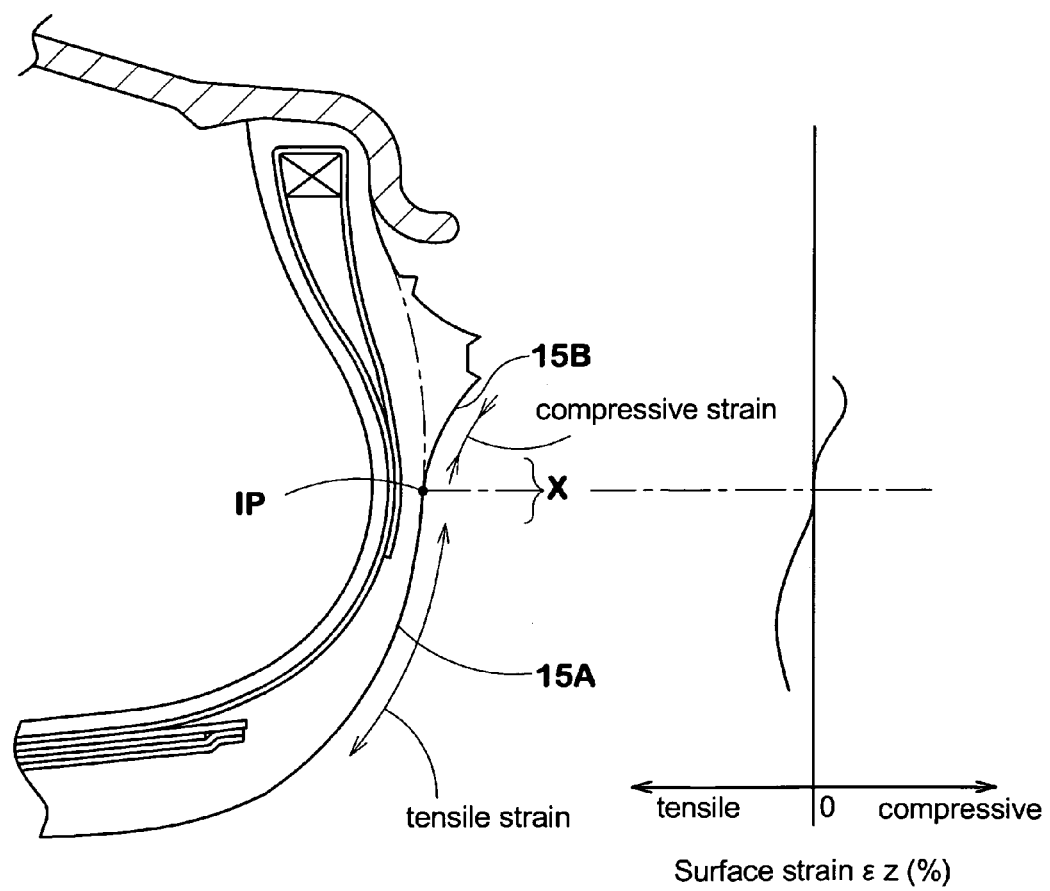
FIG. 9 is a diagram for explaining a stress neutral position occurring on the tire sidewall portion having the peculiar outer profile provided with an axially protruding portion.

If a vertical load Fz is applied to the tire 1, then, as shown in FIG. 9, in the above-mentioned region Y, a tensile strain $\epsilon z$ is caused in the convex part 15A, but a compressive strain $\epsilon z$ is caused in the concave part 15B. As a result, the vicinity X of the inflection point IP becomes neutral and the surface strain $\epsilon z$ becomes almost zero.

If the measuring position is at a radial distance of 4 mm or less from the inflection point IP, the radial strain $\epsilon z$ becomes less than 0.2% or less, namely, almost zero, even if the vertical load Fz is varied from zero to the normal tire load under the normally inflated state.

Therefore, at least one secondary strain sensor S is disposed in the vicinity X of the inflection point IP where the radial strain $\epsilon z$ becomes 0.2% or less as explained above. More specifically, the center of the sensor S is positioned at a radial distance of 4 mm or less from the inflection point IP. Since it is preferable that a plurality of secondary sensors S are arranged equiangularly around the tire rotational axis at the same radial height, eight secondary sensors S are used as shown in FIG. 10.

The protrusion 14 can be used as so called rim protector. In this example, therefore, the protrusion 14 is formed on only the sidewall portion $3o$ intended to be positioned on the outside of the vehicle. In order to use the protrusion 14 as a rim protector, in the meridian section of the tire under the normally inflated state, the protrusion 14 has to protrude axially outwardly beyond the flange of the wheel rim, and in this example, the protrusion 14 is provided with an almost trapezoidal cross sectional shape comprising a radially inner oblique side 14a, a radially outer oblique side 14b and a axially outer side 14c extending between the axially outer ends of the sides 14a and 14b. The radially inner and outer oblique sides 14a and 14b are each convexly curved. The above-mentioned concave part 15B is formed by the outer oblique line 14b.

During straight running, the side force Fy acting on the tire becomes very small or almost zero. Therefore, if the surface strain $\epsilon$ is measured during straight running, then the measured surface strain does not include the effect of the side force Fy as well as that of the vertical load Fz.

Therefore, the overall surface strain $\epsilon$ can be expressed by a linear function f'(Fx) of Fx:

$$\epsilon = f'(Fx) = a' \cdot Fx \qquad \text{Eq. 3}$$

wherein "a'" is a coefficient which is specific to the position where the strain $\epsilon$ is caused, namely, the measuring position of the strain.

Therefore, when one of the secondary sensors S comes to a measuring position whose polar angle is within a range of $0\pm30$ degrees, preferably $0\pm15$ degrees, by measuring the magnitude (t') of the strain, the longitudinal force Fx can be readily found by computing the following equation:

$$Fx = t'/a'$$

since $a' \cdot Fx = t'$.

As a result, even if some of the secondary sensors get out of order, the longitudinal force Fx which is very important for controlling the brake system, can be obtained without fail.

Similarly to the former method using seven data and the equation Eq. 2, it is also possible in this secondary method to estimate the side force Fy as well as the longitudinal force Fx. For that purpose, it is necessary to measure the strain at two different positions simultaneously. The surface strain $\epsilon$ at the respective measuring positions are expressed as follows:

$$\epsilon 1 = a'1 \cdot Fx + b'1 \cdot Fy$$

$$\epsilon 2 = a'2 \cdot Fx + b'2 \cdot Fy$$

wherein "a'1", "a'2", "b'1", "b'2" are coefficients which are specific to the positions where the strain $\epsilon$ are caused, namely, the measuring positions of the strain.

Therefore, Fy and Fx can be found by solving these two simultaneous equations in the same way as explained above.

In this case too, the number of the necessary sensors is reduced to two, therefore, even if some of the sensors get out of order, the forces Fx and Fy can be obtained without fail.

The invention claimed is:

1. A method for estimating the magnitude of a tire force acting on a rolling tire comprising:

using seven sensors mounted on the tire at circumferentially different mounting positions;

measuring a strain at seven different measuring positions (i) at a certain point of time during tire rolling by the use of said seven sensors, wherein each of the measuring positions (i) is such a position that the magnitude t(i) of the strain to be measured has a substantially linear correlation with each of seven force components which are a longitudinal force Fx, a side force Fy, a vertical load Fz, an overturning moment Mx, a rolling resistance moment My, a self-aligning torque Mz and an air pressure P acting on the tire, whereby the following conditional equation is satisfied:

$$t(i) = a(i) \cdot Fx + b(i) \cdot Fy + c(i) \cdot Fz + d(i) \cdot Mx + e(i) \cdot My + g(i) \cdot Mz + h(i) \cdot P$$

wherein a(i), b(i), c(i), d(i), e(i), g(i) and h(i) are coefficients specific to the measuring position (i);

obtaining the magnitude t(i) of the measured strain with respect to each of the seven different measuring positions (i), wherein (i) is from 1 to 7, whereby $$t1 = a1 \cdot Fx + b1 \cdot Fy + c1 \cdot Fz + d1 \cdot Mx + e1 \cdot My + g1 \cdot Mz + h1 \cdot P$$

$$t2 = a2 \cdot Fx + b2 \cdot Fy + c2 \cdot Fz + d2 \cdot Mx + e2 \cdot My + g2 \cdot Mz + h2 \cdot P$$

$$t3 = a3 \cdot Fx + b3 \cdot Fy + c3 \cdot Fz + d3 \cdot Mx + e3 \cdot My + g3 \cdot Mz + h3 \cdot P$$

$$t4 = a4 \cdot Fx + b4 \cdot Fy + c4 \cdot Fz + d4 \cdot Mx + e4 \cdot My + g4 \cdot Mz + h4 \cdot P$$

$$t5 = a5 \cdot Fx + b5 \cdot Fy + c5 \cdot Fz + d5 \cdot Mx + e5 \cdot My + g5 \cdot Mz + h5 \cdot P$$

$$t6 = a6 \cdot Fx + b6 \cdot Fy + c6 \cdot Fz + d6 \cdot Mx + e6 \cdot My + g6 \cdot Mz + h6 \cdot P$$

$$t7 = a7 \cdot Fx + b7 \cdot Fy + c7 \cdot Fz + d7 \cdot Mx + e7 \cdot My + g7 \cdot Mz + h7 \cdot P;$$

forming the following 7×7 matrix of said coefficients $$\begin{vmatrix} a1 & b1 & c1 & d1 & e1 & g1 & h1 \\ a2 & b2 & c2 & d2 & e2 & g2 & h2 \\ a3 & b3 & c3 & d3 & e3 & g3 & h3 \\ a4 & b4 & c4 & d4 & e4 & g4 & h4 \\ a5 & b5 & c5 & d5 & e5 & g5 & h5 \\ a6 & b6 & c6 & d6 & e6 & g6 & h6 \\ a7 & b7 & c7 & d7 & e7 & g7 & h7 \end{vmatrix}$$

about a combination of said seven different measuring positions (i); and computing the following equation including said matrix $$\begin{vmatrix} Fx \\ Fy \\ Fz \\ Mx \\ My \\ Mz \\ P \end{vmatrix} = \begin{vmatrix} 7 \times 7 \text{ Matrix} \\ \text{of} \\ \text{Coefficients} \end{vmatrix}^{-1} \begin{vmatrix} t1 \\ t2 \\ t3 \\ t4 \\ t5 \\ t6 \\ t7 \end{vmatrix}$$

to find at least one of the seven force components.

2. The method according to claim 1, wherein said at least one of the seven force components found is the air pressure P, and the method further comprises:

comparing the estimated air pressure P with a reference air pressure; and determining whether the air pressure of the tire is dropped or not.

3. The method according to claim 2, wherein said measuring of the strain at the seven different measuring positions (i) is carried out at certain time intervals, and in the event that the estimated air pressure P becomes lower than the reference air pressure in at least two successional comparisons therebetween, it is determined that the air pressure of the tire is dropped.

4. The method according to claim 1, wherein each of the sensors comprises a magnet and a magnetometric sensor element which are embedded in an elastomer material as one unit.

5. The method according to claim 1, wherein the sensors each have a most sensitive direction inclined at an angle of from 10 to 80 degrees with respect to the tire radial direction.

6. The method according to claim 1, wherein the tire is provided with more than seven sensors;

by the use of the more than seven sensors, the strain at more than seven different measuring positions is measured at said point of time during tire rolling; and a set of the seven measuring positions (i) are selected from said more than seven measuring positions to obtain said magnitude t(i) with respect to each of the seven different measuring positions (i) of the selected set.

7. The method according to claim 6, wherein from said more than seven measuring positions, plural sets of the seven measuring positions (i) are selected, and with respect to each of the selected sets, the magnitude t(i) with respect to each of the seven different measuring positions (i) is obtained, and said at least one of the seven force components is found as an intermediate result, and the intermediate results obtained from the plural sets are averaged to obtain the final result.

8. The method according to claim 1, which further comprises:

using a secondary sensor mounted on the tire at a secondary mounting position, wherein the secondary mounting position is such that, when the secondary mounting position comes to a secondary measuring position, the magnitude t' of a strain to be measured has a substantially linear correlation with the longitudinal force Fx, but the magnitude t' is substantially not affected by the vertical load Fz;

measuring the strain at said secondary measuring position by the use of said secondary sensor to obtain the magnitude t' thereof; and computing the following equation to find the longitudinal force Fx, $$Fx = t'/a'$$

wherein "a'" is a coefficient specific to the secondary measuring position.

9. The method according to claim 8, wherein said seven sensors are mounted on one tire sidewall portion, but said secondary sensor is mounted on the other sidewall portion, and the other sidewall portion is provided with a protrusion protruding axially outwardly and extending circumferentially of the tire so that the outer profile of the other sidewall portion comprises a curved line made up of a radially outer convex part and a radially inner concave part which are connected with each other through an inflection point, said secondary mounting position is located in a vicinity of the inflection point.

10. The method according to claim 9, wherein said secondary measuring position is near the center of the ground contacting patch of the tire.

11. A pneumatic tire comprising:

a tread portion;

a pair of sidewall portions; and a pair of bead portions, wherein one of the sidewall portions is provided with a protrusion and strain sensors, the protrusion extends continuously in the tire circumferential direction and protrudes axially outwardly so that the outer profile of the sidewall portion is provided with a curved line on the radially outside of the protrusion, the curved line is, in the meridian section of the tire, made up of a radially outer convex part and a radially inner concave part which are connected with each other through an inflection point, and said strain sensors are disposed in the vicinity of the inflection point.

12. The pneumatic tire according to claim 11, wherein said protrusion is provided on only said one of the sidewall portions, and the other sidewall portion is also provided with strain sensors.

* * * * *